(12) United States Patent
Xu et al.

(10) Patent No.: US 11,792,053 B2
(45) Date of Patent: Oct. 17, 2023

(54) METHOD OF REALIZATION OF ADAPTIVE EQUALIZATION AND ADAPTIVE EQUALIZER

(71) Applicant: EverPro Technologies Company Limited, Hubei (CN)

(72) Inventors: Liang Xu, Beijing (CN); Yan Li, Beijing (CN); Jinfeng Tian, Beijing (CN); Yufeng Cheng, Beijing (CN); Yanan Chen, Beijing (CN)

(73) Assignee: EverPro Technologies Company Limited, Wuhan (CN)

( * ) Notice: Subject to any disclaimer, the term of this patent is extended or adjusted under 35 U.S.C. 154(b) by 0 days.

(21) Appl. No.: 17/931,740

(22) Filed: Sep. 13, 2022

(65) Prior Publication Data
US 2023/0224192 A1    Jul. 13, 2023

(30) Foreign Application Priority Data
Jan. 11, 2022    (CN) .......................... 202210026119.0

(51) Int. Cl.
*H04L 25/03* (2006.01)

(52) U.S. Cl.
CPC .. *H04L 25/03038* (2013.01); *H04L 25/03885* (2013.01)

(58) Field of Classification Search
CPC ......... H04L 25/03006; H04L 25/03019; H04L 25/03038; H04L 25/03076; H04L 25/03885
(Continued)

(56) References Cited

U.S. PATENT DOCUMENTS 4,780,772 A * 10/1988 Shibuya ........... G11B 20/10527
369/59.19
5,436,771 A * 7/1995 Yun ........................ H04N 5/926
386/E5.028
(Continued)

FOREIGN PATENT DOCUMENTS

CN    110190862 A    8/2019
CN    111131101 A    5/2020
(Continued)

OTHER PUBLICATIONS

First Office Action from corresponding Chinese Application No. 202210026119.0, dated Feb. 25, 2022, English translation attached.
(Continued)

*Primary Examiner* — Young T. Tse
(74) *Attorney, Agent, or Firm* — Grossman, Tucker, Perreault & Pfleger, PLLC.

(57) ABSTRACT

A method of realization of adaptive equalization and an adaptive equalizer. The adaptive equalizer comprises an equalizer unit, which is used for equaling an input signal according to a compensation coefficient to obtain an output signal; a sampling comparison unit, which is connected to an output of the equalizer and is used for sampling a comparison result of the output signal of the equalizer and a reference voltage corresponding to reference voltage step; a data processing unit, which is connected to the sampling comparison unit and the equalizer unit. It is used for scanning a reference voltage step to determine range of the reference voltage steps to which step the amplitude of the output signal is corresponding; and scanning a compensation coefficient step, and determining the compensation coefficient for equalization according to the range of reference voltage steps. The solution of the present invention resolves such problems as long adaptive adjustment time, algorithm
(Continued)

complex and large power consumption of the existing self-adaptive equalization algorithm.

14 Claims, 4 Drawing Sheets

(58) Field of Classification Search
USPC ......... 375/229, 232, 348, 350; 708/322, 323
See application file for complete search history.

(56) References Cited

U.S. PATENT DOCUMENTS

| | | | |
|---|---|---|---|
| 10,644,911 B1 | 5/2020 | Chen | |
| 11,206,157 B1 * | 12/2021 | Hung | H04L 25/03885 |
| 11,444,813 B1 * | 9/2022 | Wang | H04L 25/08 |
| 2004/0190661 A1 * | 9/2004 | Vrazel | H04L 25/03885 |
| | | | 375/350 |
| 2010/0046600 A1 * | 2/2010 | Zerbe | H01L 21/76805 |
| | | | 375/232 |
| 2010/0135378 A1 * | 6/2010 | Lin | H04L 7/0058 |
| | | | 375/232 |
| 2015/0085912 A1 * | 3/2015 | Cho | H04L 25/03885 |
| | | | 375/232 |

FOREIGN PATENT DOCUMENTS

| | | | |
|---|---|---|---|
| CN | 111257617 A | 6/2020 | |
| CN | 112737990 A | 4/2021 | |
| EP | 1901508 A2 * | 3/2008 | ....... H04L 25/03019 |

OTHER PUBLICATIONS

Notification to Grant Patent from corresponding Chinese Application No. 202210026119.0, dated Apr. 1, 2022, English translation attached.

Chinese search report from corresponding Chinese Application No. 202210026119.0, dated Feb. 18, 2022, English translation attached.

* cited by examiner

METHOD OF REALIZATION OF ADAPTIVE EQUALIZATION AND ADAPTIVE EQUALIZER

PRIORITY INFORMATION

The present application claims priority to Chinese patent application No. CN202210026119.0 filed to Patent Office of the People's Republic of China on Jan. 11, 2022 with the title of "A method of realization of adaptive equalization and an adaptive equalizer", which is incorporated herein by reference in its entirety.

TECHNICAL FIELD

The present invention generally relates to the field of adaptive equalization. Specifically, the present invention relates to a method of realization of adaptive equalization and an adaptive equalizer.

BACKGROUND

This part aims to provide background or context for the embodiments of the present invention declared in the claims. The description herein may include the exploratory concepts, but not necessarily the concepts that have been considered or explored previously. Therefore, the content described in this part does not refer to the prior art with respect to the description and claims of the present application and is not recognized as the prior art, even though it is contained in this part, unless noted herein.

With technical development, signal attenuation caused by high data transmission rate and long-distance transmission is getting more seriously because the transmission rate of data is getting faster, and the transmission distance is getting longer. The inter symbol interference (ISI) effect caused by limited bandwidth is becoming a major difficulty in high-speed interface applications. In order to eliminate or reduce inter symbol interference caused by multipath delay in broadband communication, a variety of equalization techniques are used at a signal transmitting port and a receiving port. For example, a continuous time liner equalizer (CTLE) is arranged at the receiving port. CTLE is used to effectively improve the performance of eye pattern of the receiving end on a link with large transmission loss, so as to effectively optimize data transmission performance. At present, the adaptive equalizer is usually required in communication between chips to adapt to different channels conditions through automatic adjustment of compensation capability. Accordingly, there are many equalizers applying various adaptive algorithm theories, wherein, three typical adaptive equalization algorithms are described as follows.

The first one is to realize an adaptive algorithm based on a spectrum equalization technology, which is belong to a pure analog approach. Its core concept is to analyze the energy of frequency domain of data stream to find a certain frequency point and divide the spectrum into two parts. The compensation ability of the equalizer is adjusted by comparing the energy of low frequency band and of high frequency band to equalize the two parts energy for an optimal compensation. Real-time judgment and adjustment however are the shortages of this method, so that lager power is consumed during work and adaptive compensation effect is easily affected by process deviation.

The second one is an adaptive equalization based on zero forcing principle, of which the key technology is to sample data symbol stream to pick up some certain data patterns and determine current state (under-compensation or over-compensation state) by ISI detection method to adjust compensation ability of the equalizer for the optimal compensation. But high-speed clock synchronous sampling at high-speed transmission rate is required in this method, and equalization effect greatly depends on generation process of high-speed clock.

The third one is an adaptive equalization algorithm achieved by monitoring eye diagram on the basis of asynchronous clock sampling, of which the key technology is to judge result of sampling data within each partitioned zone based on histogram data analysis through monitoring longitudinal eye diagram to determine current equalization state so as to adjust the compensation ability of the equalizer for an optimal compensation. But this method requires to combine a scanning threshold level with an adaptive adjustment level, so that adaptive equalization will take a long time to adjust.

In view of this, some shortages are generally faced by current adaptive equalization methods, such as long adaptive adjustment time, algorithm complex and requiring real-time monitoring.

SUMMARY

In order to resolve one and more technical problems mentioned above, the present invention provides adjusting the compensation step of a high-frequency signal by testing amplitude range of a low frequency signal in channel, thereby effectively improving compensation effect of the high-frequency signal and reducing adaptive equalization time. To achieve this object, the present invention employs technical solutions in following aspects.

One aspect of the present invention includes a method of realization of adaptive equalization, comprising:

obtaining output signals of an equalizer; scanning the reference voltage steps to determine the range of reference voltage steps corresponding to amplitude of the output signals; and scanning compensation coefficient steps and determine a compensation coefficient for equalizing according to the range of reference voltage steps.

In one embodiment, wherein the obtaining output signals of an equalizer comprises: the input signals are equalized by adopting minimum compensation strategy to obtain the output signals, wherein the minimum compensation strategy is the compensation coefficient step of the equalizer is minimum.

In one embodiment, wherein the scanning reference voltage steps to determine the range of reference voltage steps corresponding to amplitude of the output signals, comprises: sampling the output signals based on the reference voltage steps to obtain the sampling result; determining if the sampling result matches a first preset condition; if the sampling result matches the first preset condition, determining the range of reference voltage steps corresponding to amplitude of the output signals according to reference voltages corresponding to the reference voltage steps.

In one embodiment, wherein the sampling the output signals based on the reference voltage steps comprises: selecting the reference voltage steps from maximum according to descending rule to sample the output signals.

In one embodiment, wherein the first preset condition comprises: the number of valid signals in the sampling result is greater than a first threshold.

In one embodiment, wherein the scanning reference voltage steps to determine the reference voltage steps corresponding to amplitude of the output signals comprises:

setting the range of reference voltage steps according to amplitude range of the output signals.

In one embodiment, wherein the setting the range of reference voltage steps according to amplitude of the output signals comprises: determining a first reference voltage step and a second reference voltage step below the range of reference voltage steps, wherein, the second reference voltage step is less than the first reference voltage step; sampling the output signals based on the range of reference voltage steps, the first reference voltage step and the second reference voltage step to obtain a first sampling result, a second sampling result and a third sampling result, respectively; determining whether the first sampling result, the second sampling result and the third sampling result match the second preset condition. If the sampling result matches the second preset condition, determining the range of reference voltage steps according to the first reference voltage step.

In one embodiment, wherein the second preset condition comprises: the number of the valid signals in the second sampling result is greater than that in the first sampling result and that in the third sampling result, respectively, and the difference between the number of valid signals in the second sampling result and that in the first sampling result are greater than a setting value, the same as the difference between the number of valid signals in the second sampling result and that in the third sampling result.

In one embodiment, wherein the scanning the compensation coefficient steps, and determining the compensation coefficient for equalization according to the range of reference voltage steps comprises: adjusting the compensation coefficient step of the equalizer to obtain equalization results corresponding to the varies compensation coefficients, the equalization result is the output signals of the equalizer after adjusting the compensation coefficient; selecting the compensation coefficient corresponding to the compensation coefficient steps according to the equalization result of the varies compensation coefficient steps and the range of reference voltage steps.

In one embodiment, wherein the selecting the compensation coefficient corresponding to the compensation coefficient step for equalization according to the equalization result corresponding to the varies compensation coefficient steps comprises: comparing the equalization results with the reference voltages in the range of reference voltage steps to obtain a comparison result; sorting the varies compensation coefficient steps according to the number of valid signals in the comparison result; selecting the compensation coefficient corresponding to the compensation coefficient steps ranked higher than a set order for equalization.

In one embodiment, wherein the selecting the compensation coefficient corresponding to the compensation coefficient steps ranked higher than the set order for equalization comprises: in the compensation steps which are ranked higher than the set order, selecting the compensation coefficient corresponding to the compensation step with max level value for equalization.

In one embodiment, further comprising: determining whether the compensation coefficient for equalization is obtained within a set time after energization of the equalizer; locking the compensation coefficient for equalization in response to obtaining the compensation coefficient for equalization within the set time, shutting down other function modules except the equalizer to reduce power consumption.

The present invention also provides an adaptive equalizer, comprising: an equalizer unit, which is used for equalizing the input signals according to the compensation coefficient to obtain the output signals; a sampling comparison unit, which is connected to the output terminal of the equalizer unit and is used for sampling the comparison result between the output signals from the equalizer and the reference voltage corresponding to the reference voltage steps; a data processing unit, which is connected to the sampling comparison unit and the equalizer unit. The adaptive equalizer is used for scanning the reference voltage steps to determine the range of reference voltage steps corresponding to amplitude of the output signals; and scanning the compensation coefficient step, and determining the compensation coefficient for equalization according to the range of reference voltage steps.

According to the present invention, the range of reference voltage steps corresponding to amplitude of the low-frequency signal is first judged at the time of adaptive equalization to adjust the compensation coefficient to compensate the high-frequency signal. Specifically, the range of reference voltage steps for equalization is set according to amplitude of the output signal of the equalizer to obtain an amplitude standard of a low-frequency component in a channel, and accordingly adjust the compensation coefficient for compensation to the high-frequency signal, thereby achieving effective adaptive equalization of the channel. Based on this, the method that adaptively adjusts the compensation coefficient of the equalizer described in the present invention is simple and can effectively save adaption adjustment time to achieve quick and effective equalization strategy. Furthermore, the present invention adjusts a reference voltage value by descending when determining amplitude range of the signal, so that the correct amplitude range can be quickly detected in case of large signal attenuation to effectively improve accuracy of adaptive equalization. Furthermore, the present invention obtains the proper compensation coefficient by determining the compensating step to effectively avoid step transition caused by noise disturbance and improve stability of adaptive adjustment result.

BRIEF DESCRIPTION OF THE DRAWINGS

The mentioned purposes, features and advantages and others in the embodiments of the present invention can be understood easily by reading the detailed description below with reference to the drawings. In the drawings, several embodiments of the present invention are illustrated in exemplary manner instead of restrictive manner, and the same or corresponding reference codes refer to the same or corresponding parts, wherein.

DETAILED DESCRIPTION

The technical solutions in the embodiments are clearly and completely described in following paragraphs in combination with the drawings. Obviously, the embodiments described herein are a part of embodiments of the present invention instead of all embodiments. Based on the embodiments of the present invention, other embodiments obtained by the persons skilled in the art without creative efforts are all protected by the present invention.

It should be understood that the terms "first", "second", "third" and "fourth" used in the Claims, Description and Drawings of the present invention are used for distinguishing different objects instead of describing specific sequence. The terms "comprising" or "including" used in the Description and Claims of the present invention indicate the presence of the described features, entireties, procedures, operations, elements and/or components, but do not exclude the presence or addition of one or more other features, entireties, procedures, operations, elements and/or collections thereof.

It should be understood that the terms used in the Description of the present invention is only intended to describe specific embodiments rather than limiting the present invention. As used in the Description and Claims of the present invention, the singular forms of "a", "an" and "the" are intended to include the plural forms, unless other conditions indicated clearly in context. Furthermore, it is necessary to understand that the terms "and/or" used in the Description and Claims of the present invention refer to any combination and all impossible combinations of one or more associated items listed and include these combinations.

As used in the Description and Claims, the term "if" can be explained as "when", or "once", or "in response to determine" or "in response to detect" in the context. Similarly, phrases "if determining" or "if detecting [condition or event described]" can be explained as "once determining" or "in response to determine" or "once detecting [condition or event described]" or "in response to detect [condition or event described]" in the context.

Next, the specific embodiments of the present invention are illustrated in combination with the drawings.

Figure 1:
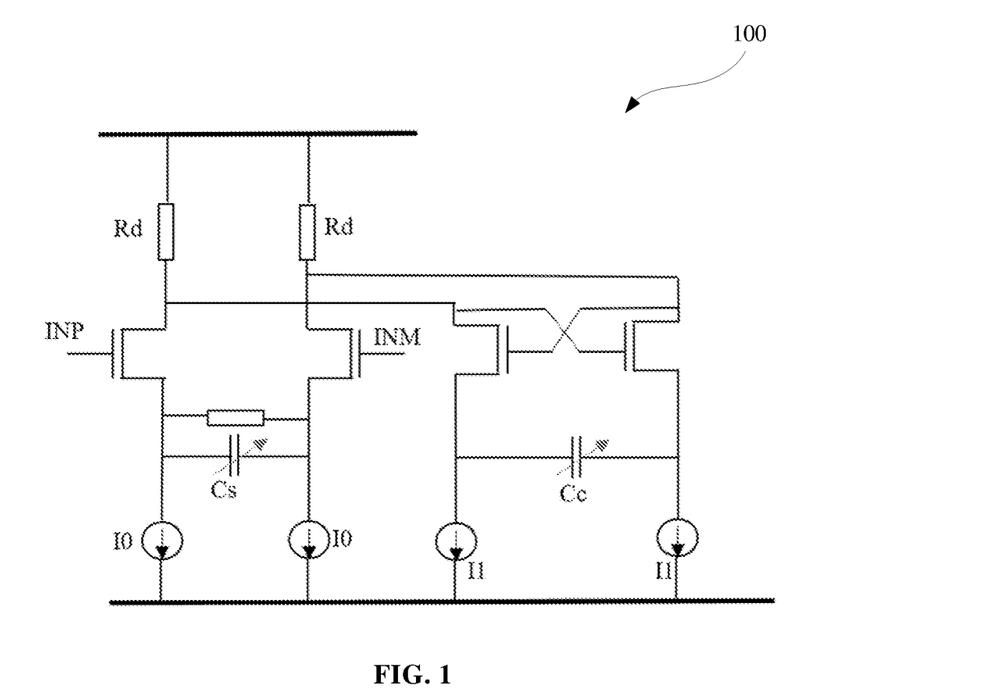
FIG. 1 is a scenario diagram of implementation of adaptive equalization solution in which the present invention is applied.

FIG. 1 is a scenario diagram 100 of implementation of adaptive equalization solution in which the present invention is applied;

In the context of the present invention, the equalizer used in the scenario mentioned above can be a CTLE with a source degeneration resistor and capacitor, with addition of a negative capacitance compensation technology. The structure of the equalizer is shown in FIG. 1. Specifically, the equalizer with the source degeneration resistor and capacitor comprising the negative feedback capacitors Cs and Cc, and several transistors, two of which gates are used as input nodes. During adaptive regulation, DC voltage gain of CTLE remains unchanged, and only the Cs and Cc are required to be adjusted for compensation of different voltage amplitudes. The present invention is intended to obtain the compensation coefficient by sampling and analyzing (namely, adjustment of the negative feedback capacitors Cs and Cc) to realize compensation setting of the equalizer.

Figure 2:
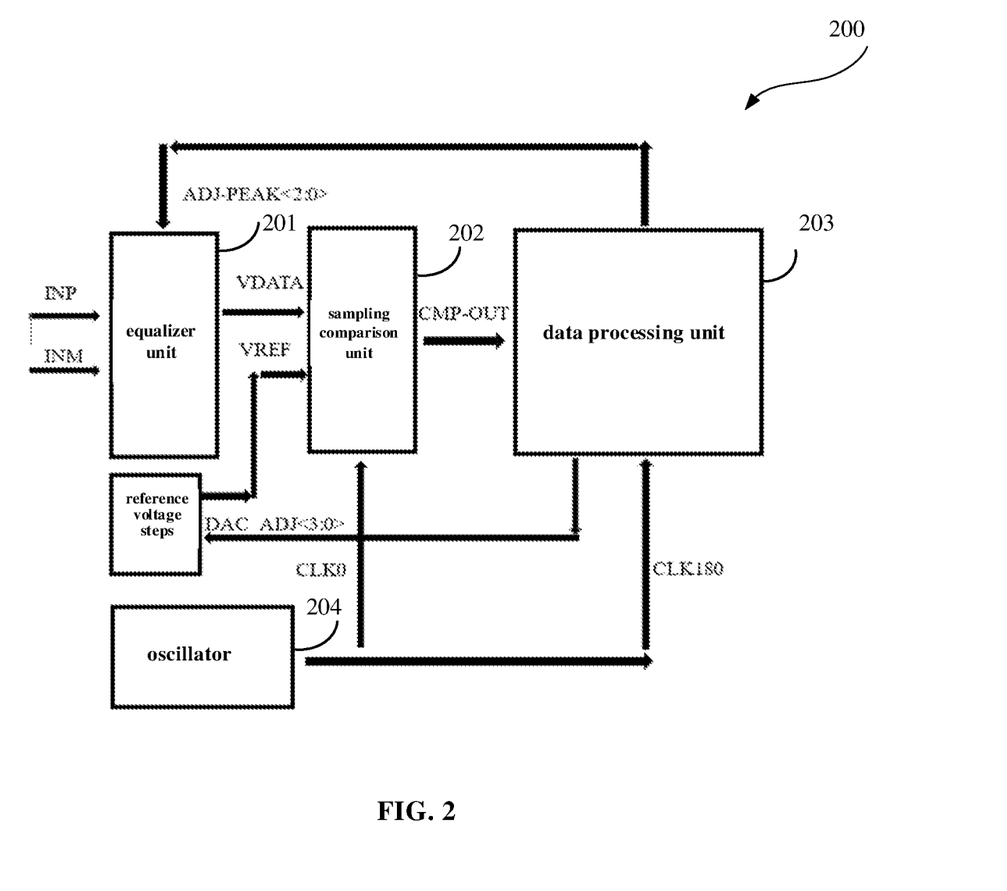
FIG. 2 is a diagram of structure of the adaptive equalizer according to embodiments of the present application.

FIG. 2 is a diagram 200 of structure of the adaptive equalizer according to embodiments of the present application. It is necessary to understand that the equalizer unit shown in FIG. 2 can be the equalizer structure shown in FIG. 1, and thus the description in FIG. 2 is equally applicable to FIG. 1.

As shown in FIG. 2, the adaptive equalizer comprising an equalizer unit 201 (hereinafter referred to as the equalizer), a sampling comparison unit 202, a data processing unit 203 and an oscillator 204. The oscillator 204 can give a low-speed asynchronous sampling clock signal when the compensation coefficient of the equalizer unit 201 is adaptively adjusted. The clock signals with a phase difference of 180° are sent to the sampling comparison unit 202 and the data processing unit 203, respectively, to perform data processing and analysis. When performing adaptive equalization, a high-speed signal after channel attenuation is fed to the equalizer 201 (for example, the equalizer CTLE), and the CTLE outputs a VDATA data. The sampling comparison unit 202 can compare the VDATA data with the VREF (reference voltage), so that a series of "0" signals (signals represented as 0) and "1" signals (signals represented as 1) can be output at sampling clock frequency. The data processing unit 203 scans the reference voltage steps (for example, different levels within the reference voltage steps DAC ADJ <3:0>) to acquire amplitude of the signals. Then, the corresponding range of VREF steps can be set through the amplitude of the signal, and the compensation step of CTLE can be adjusted accordingly to analyze the optimal compensation coefficient. At last, the equalizer locks the compensation coefficient corresponding to the compensation step, thereby closing the data processing units except the equalizer CTLE to reduce power consumption.

Furthermore, in the present invention, the reference voltage steps (for example, steps within DAC ADJ<3:0>) can be utilized to analyze when determining the range of VREF steps, thereby acquiring the proper reference voltage step for easy detection of optimal signal amplitude.

The information mentioned above simply describes the scenarios and implementation methods of the adaptive equalization solution in the present invention. Next, the embodiments of the solution are explained in combination with specific steps.

Figure 3:
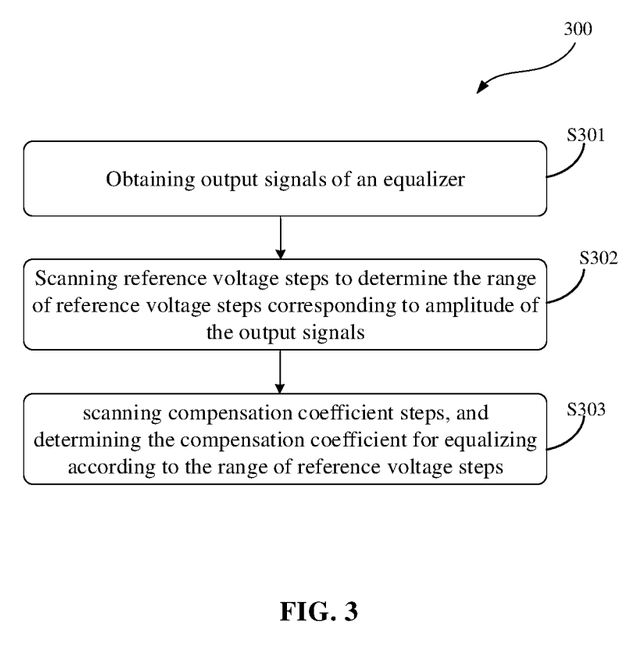
FIG. 3 is a flowchart of implementation method of adaptive equalization according to embodiments of the present application.

FIG. 3 is a flowchart 300 of implementation method of adaptive equalization according to embodiments of the present application. It should be understood that the equalizer herein can be the equalizer CTLE described in FIG. 1, and thus the details described in FIG. 1 is equally applicable to paragraphs below.

As shown in FIG. 3, the output signals of equalizer are acquired at step S301. In some embodiments, the solution of the present invention can be applied for a period after startup of the equalizer. Firstly, the least compensation coefficient can be set for the equalizer, and the compensation value of the equalizer is lowest at this moment, and the output signals will be the signals with large attenuation. Therefore, a better equalization effect can be achieved when being analyzed by the adaptive algorithm.

The reference voltage steps are scanned at step S302 to determine the range of reference voltage steps corresponding to amplitude of the output signals of the equalizer and determine amplitude of the low-frequency component. In some embodiments, the high-frequency signals will be attenuated during signal transmission in channel. And thus, the compensation requirement of the high-frequency signals can be judged based on amplitude of the low-frequency signal for quick and correct compensation to the high-frequency signals.

In some embodiments, the range of reference voltage steps can be set according to the output signals from the equalizer, so that the compensation ability of the high-frequency signals is regulated by taking the amplitude of the low-frequency signals as reference, thereby balancing the high-frequency signals and the low-frequency signals.

At step S303, scanning the compensation coefficient steps and determining the compensation coefficient for equalizing according to the range of reference voltage steps. In some embodiments, the compensation coefficient of the equalizer can be selected after determining the range of reference voltage steps, thereby adjusting compensation ability of the equalizer to the high-frequency signals. For example, the compensation step with the best compensation effect is selected through traversing all compensation coefficient steps, thereby achieving adaptive equalization.

The compensation ability of the high-frequency signals are adjusted based on the low-frequency signals through the solution of the present invention to achieve adaptive equalization. Moreover, the present invention firstly judges the amplitude of the low-frequency signals (namely, the range of reference voltage steps) and selects the compensation coefficient for equalization, thereby effectively reducing the duration of adaptive adjustment process.

The solution of the present invention is simply described through the information mentioned above through FIG. 3. Next, the solution will be explained in detail in combination with the implementation of specific procedures.

Figure 4:
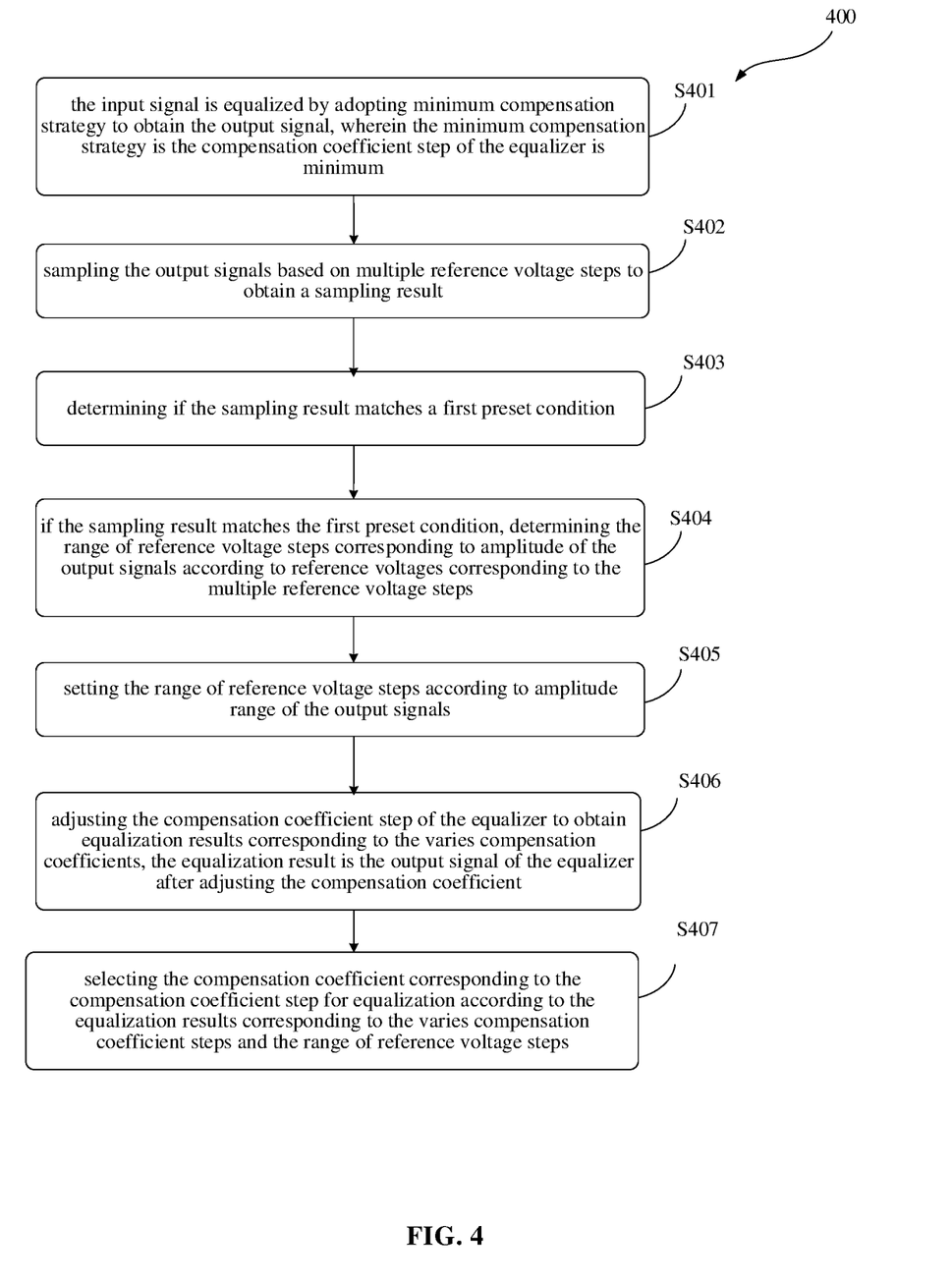
FIG. 4 is a flowchart of specific implementation method of adaptive equalization according to embodiments of the present application.

FIG. 4 is a flowchart 400 of implementation method of adaptive equalization according to embodiments of the present application. It is necessary to understand that the equalizer herein can be the equalizer CTLE described in FIG. 1 or 2, and thus the details described in FIG. 1 or 2 is equally applicable to paragraphs below.

As shown in FIG. 4, the output signals of the equalizer are acquired at step S401. In one scenario, the input signals are equalized by adopting the least compensation strategy to obtain the output signals, wherein, the minimum compensation strategy is the compensation coefficient step of the equalizer is minimum. Based on this, the signals with large attenuation can be acquired for calculation of the compensation coefficient, thereby further making the equalizer possess a better compensation ability.

At step S402, sampling the output signals based on multiple reference voltage steps to obtain a sampling result. In some embodiments, reference voltage steps can be selected according to sequence descending rule from max value of the reference voltage steps to sample the output signals, thereby acquiring the number of valid signals in the output signals. For example, the reference voltage steps are traversed from max value to compare the output signals with the corresponding reference voltage, and sample the comparison result to acquire "0" signals or "1" signals. For example, 4096 sampling points can be sampled in the comparison result and the "1" signals can be counted. Then, the range of reference voltage steps are scanned from maximum to minimum, and the "1" signals are counted under each reference voltage step, respectively, wherein, the "1" signals in the sampling points indicates that the signal amplitude is within the corresponding range of reference voltage steps.

At step S403, determining if the sampling result matches the first preset condition. In some embodiments, the first preset condition comprises that the number of valid signals in the sampling result should be more than the first threshold. For example, 256 can be selected as the first threshold while there are 4096 sampling points. In other words, it is necessary to judge if the number of the "1" signals in 4096 sampling points is more than 256.

At step S404, if the sampling result matches the first preset condition, determining the range of reference voltage steps corresponding to amplitude of the output signals according to the reference voltage corresponding to the multiple reference voltage steps. In some embodiments, the sampling result matches the first preset condition, it is suggested that amplitude of the output signals is exactly within the range determined by the certain two reference voltages. For example, when 256 "1" signals are detected in 4096 sampling points, the range of the effective signals at this moment can be determined according to the reference voltage. Based on this, the range of reference voltage steps corresponding to amplitude of the output signals can be determined.

At step S405, setting the range of reference voltage steps according to amplitude of the output signals. In some embodiments, sampling the output signals based on the reference voltage to recognize the amplitude of the low-frequency signals. And the range of reference voltage steps can be set according to the amplitude for selection of the compensation coefficient of the high-frequency signals.

In some embodiments, in order to improve reliability and accuracy of the signal amplitude under large attenuation, the correct range of reference voltage steps can be further determined by judgment process of the reference voltage steps. Specifically, the reference voltage step VREF0 can be determined firstly, and the range of VREF steps mentioned above can be regarded as the range corresponding to the reference voltage step VREF0. A first reference voltage step VREF1 and a second reference voltage step VREF2 which are below the range of reference voltage steps can be determined, wherein, the second reference voltage step VREF2 is less than the first reference voltage step VREF1; the output signals are sampled using the VREF0, the VREF1 and the VREF2 (for example, take sample 4096 times) to obtain sampling results ("1" signals in sampling points), which are recorded as a first sampling result, a second sampling result and a third sampling result, respectively; For example, the number of signals representing 1 in the first sampling result is N0, the number of signals representing 1 in the second sampling result is N1, and the number of signals representing 1 in the third sampling result is N2. Determining whether the first sampling result, the second sampling result and the third sampling result match the second preset condition. At last, when the first, the second and the third sampling results match the second preset condition, the range of reference voltage steps is determined according to the first reference voltage step.

Furthermore, the second preset condition mentioned above can be determined by following methods: the number of valid signals in the second sampling result is greater than that in the first sampling result and that in the third sampling result, respectively, and the difference between the number of valid signals in the second sampling result and that in the first sampling result is greater than a setting value, the same as the difference between the number of valid signals in the second sampling result and that in the third sampling result. It should be understood that the valid signals mentioned above are the "1" signals in sampling points.

For example, configuring the reference voltage steps to max, sampling the comparison result under the current configuration, that is, count the "1" signals in 4096 sampling points, and scanning the reference voltage step DAC_ADJ from maximum to minimum until the "1" signals in 4096 sampling points are more than 256 for the first time at one certain reference voltage, namely, the range of the current valid signals (amplitude of low-frequency signal). Record the reference voltage step detected at this moment as VREF0 to be used as the reference voltage step and record the range of reference voltage steps corresponding to the VREF0 at this moment and record the "1" signals counted under the reference voltage step as N0.

Reducing 1 reference voltage step form VREF0 to be the first reference voltage step VREF1, and record the "1" signals in 4096 sampling points under the first reference voltage step VREF1 as N1. Reducing 1 more reference voltage step to be the second reference voltage step VREF2 and record the "1" signals in 4096 sampling points under VREF2 as N2. If N1-N0>512 and |N1-N2|<=512, taking the VREF0 as an optimal reference voltage step VREF step. If N1-N0>512 and N1-N2>512, select the VREF1 as the optimal reference voltage step VREF. If both two relationships mentioned above cannot match, the VREF0 can still be taken as the optimal reference voltage step.

After determining the range of reference voltage steps, further implementing step S406, adjusting the compensation coefficient step of the equalizer to obtain the equalization result corresponding to the varies compensation coefficients, wherein the equalization result is the output signals of the equalizer after adjustment of the compensation coefficient. In some embodiments, adjusting the compensation coefficient step of the equalizer from minimum to maximum. In other words, gradually determining the compensation effect from the lowest compensation coefficient step of the equalizer. It is necessary to understand that such method that adjusts the compensation coefficient step from minimum to maximum is only used as example instead of limitation. The personnel skilled in the art can regulate that depending on actual needs.

At last, at step S407, selecting the compensation coefficient corresponding to the compensation coefficient step for equalization according to the equalization results corresponding to the different compensation coefficient steps and the range of reference voltage steps. In some embodiments, comparing the equalization results output by the equalizer after adjustment of the compensation coefficient with the reference voltage in the range of reference voltage steps to obtain the comparison result. Then, sorting the varies compensation coefficient steps according to the number of valid signals in the comparison result. At last, selecting the compensation coefficient corresponding to the compensation coefficient step which is ranked higher than the set order for equalization. For example, 8 compensation coefficient steps (ADJ_PEAK<2:0>=000~111) can be traversed from minimum to maximum. After adjusting the compensation coefficient of the equalizer according to the compensation coefficient step, the equalization result can be judged by using the reference voltage in the range of reference voltage steps mentioned above, thereby counting the number of valid signals under the reference voltage step. For example, sample 4096 points and count the number of sampling points representing 1 in 4096 sampling points.

And then sequencing the different compensation coefficient steps according to the number of valid signals to select the optimal one for equalization. For example, if the compensation step is at 2, 3 and 5, the equalizer outputs the most valid signals, any one of the step 2, 3 and 5 can be taken for equalization.

Furthermore, in the compensation steps which are ranked higher than the set order, selecting the compensation coefficient corresponding to compensation step with max level value for equalization. For example, with respect to step 2, 3 and 5 which ranked at top three in the compensation coefficient steps, the highest step can be selected for equalization, namely, step 5 can be selected.

It should be understood that the number of the sampling points selected in the present invention and the number of valid signals for determination of the signal amplitude are used as example instead of limitation. The personnel skilled in the art can rationally configure that depending on specific conditions during channel transmission process. For example, the number of sampling points can be 4096, or 8192. When determining the reference voltage step, the judgment standard for the number of valid signals can be 256, or 518 or 128.

In above solutions, the adaptive equalization can be performed by sampling under the asynchronous clock, which can effectively reduce the pressure on demand for the high-speed clock. In addition, after completion of the adaptive algorithm in the present invention, the compensation coefficient step of the equalizer is saved and others functional modules for analysis can be closed, thereby effectively reducing the loss consumption of the whole circuit. Furthermore, the adaption time is reduced and the reliability of the position under large amplitude of attenuation is increased by confirming amplitude of the output signals and then adjusting the compensation steps. Additionally, the selection result of the compensation coefficient step caused by an asynchronous sampling error can avoid jumping by sequencing the compensation coefficient step, thereby improving the stability of the whole adaptive algorithm result. In addition, the solution for implementation of adaptive equalization described in the present invention can be used in digital manner to complete analysis of adaptive algorithm for easy transplant among different processes.

Although several embodiments of the present invention have been illustrated and described in the description, clearly, they are only used as the examples for the persons skilled in the art. And thus, the persons can make more changes, alterations, or replacements without departing from the range and intention of the present invention. It is necessary to understand that various alternative solutions for the embodiments of the present invention described in the application can be used during implementation of the invention. The claims attached is intended to limit the protection scope of the invention, thereby covering the modular components, equivalents, or alternatives within the claims.

What claimed is:

1. A method of realization of adaptive equalization, the method comprising:
    obtaining output signals of an equalizer;
    scanning reference voltage steps to determine a range of the reference voltage steps corresponding to an amplitude of the output signals; and
    scanning compensation coefficient steps of the equalizer, and determining a compensation coefficient for equalizing according to the range of the reference voltage steps;
    wherein the scanning the reference voltage steps to determine the range of the reference voltage steps corresponding to the amplitude of the output signals comprises:
        sampling the output signals based on multiple reference voltage steps to obtain a sampling result;
        determining if the sampling result matches a first preset condition; and
        if the sampling result matches the first preset condition, determining the range of the reference voltage steps corresponding to the amplitude of the output signals according to reference voltages corresponding to the multiple reference voltage steps.

2. The method according to claim 1, wherein the obtaining the output signals of the equalizer comprises:
    equalizing input signals by adopting a minimum compensation strategy to obtain the output signals, wherein the minimum compensation strategy is a compensation coefficient step of the equalizer is minimum.

3. The method according to claim 1, wherein the sampling the output signals based on the multiple reference voltage steps to obtain the sampling result comprises:

selecting the reference voltage steps from maximum according to descending rule to sample the output signals.

4. The method according to claim 3, wherein the scanning the reference voltage steps to determine the range of the reference voltage steps corresponding to the amplitude of the output signals further comprises:
setting the range of the reference voltage steps according to an amplitude range of the output signals.

5. The method according to claim 4, wherein the setting the range of the reference voltage steps according to the amplitude range of the output signals comprises:
determining a first reference voltage step and a second reference voltage step below the range of the reference voltage steps, wherein, the second reference voltage step is less than the first reference voltage step;
sampling the output signals based on the range of the reference voltage steps, the first reference voltage step and the second reference voltage step to obtain a first sampling result, a second sampling result and a third sampling result, respectively;
determining whether the first sampling result, the second sampling result and the third sampling result match a second preset condition; and
if the first sampling result, the second sampling result and the third sampling result match the second preset condition, determining the range of the reference voltage steps according to the first reference voltage step.

6. The method according to claim 5, wherein the second preset condition comprises:
a number of valid signals in the second sampling result is greater than a number of valid signals in the first sampling result and a number of valid signals in the third sampling result, and a difference between the number of valid signals in the second sampling result and the number of valid signals in the first sampling result is greater than a setting value, the same as a difference between the number of valid signals in the second sampling result and the number of valid signals in the third sampling result.

7. The method according to claim 1, wherein the first preset condition comprises:
a number of valid signals in the sampling result is greater than a first threshold.

8. The method according to claim 7, wherein the scanning the reference voltage steps to determine the range of the reference voltage steps corresponding to the amplitude of the output signals further comprises:
setting the range of the reference voltage steps according to an amplitude range of the output signals.

9. The method according to claim 8, wherein the setting the range of the reference voltage steps according to the amplitude range of the output signals comprises:
determining a first reference voltage step and a second reference voltage step below the range of the reference voltage steps, wherein, the second reference voltage step is less than the first reference voltage step;
sampling the output signals based on the range of the reference voltage steps, the first reference voltage step and the second reference voltage step to obtain a first sampling result, a second sampling result and a third sampling result, respectively;
determining whether the first sampling result, the second sampling result and the third sampling result match a second preset condition; and
if the first sampling result, the second sampling result and the third sampling result match the second preset condition, determining the range of the reference voltage steps according to the first reference voltage step.

10. The method according to claim 9, wherein the second preset condition comprises:
a number of valid signals in the second sampling result is greater than a number of valid signals in the first sampling result and a number of valid signals in the third sampling result, and a difference between the number of valid signals in the second sampling result and the number of valid signals in the first sampling result is greater than a setting value, the same as a difference between the number of valid signals in the second sampling result and the number of valid signals in the third sampling result.

11. The method according to claim 1, wherein the scanning the compensation coefficient steps of the equalizer, and determining the compensation coefficient for equalization according to the range of the reference voltage steps comprise:
adjusting the compensation coefficient steps of the equalizer to obtain equalization results corresponding to a plurality of compensation coefficients steps, the equalization results are the output signals of the equalizer after adjusting the compensation coefficient steps of the equalizer; and
selecting a compensation coefficient corresponding to the compensation coefficient steps for equalization according to the equalization results corresponding to the plurality of compensation coefficients steps and the range of the reference voltage steps.

12. The method according to claim 11, wherein the selecting the compensation coefficient corresponding to the compensation coefficient steps for equalization according to the equalization results corresponding to the plurality of compensation coefficients steps and the range of the reference voltage steps comprises:
comparing the equalization results with reference voltages in the range of the reference voltage steps to obtain a comparison result;
sorting the plurality of compensation coefficient steps according to a number of valid signals in the comparison result; and
selecting the compensation coefficient corresponding to at least one compensation coefficient step which is ranked higher than a set order for equalization.

13. The method according to claim 12, wherein the selecting the compensation coefficient corresponding to the compensation coefficient step which is ranked higher than the set order for equalization comprises:
in a plurality of compensation coefficient steps which are ranked higher than the set order for equalization, selecting a compensation coefficient corresponding to a compensation coefficient step with max level value for equalization.

14. The method according to in claim 1 further comprising:
determining whether the compensation coefficient for equalization is obtained within a set time after energization of the equalizer; and
locking the compensation coefficient for equalization in response to obtaining the compensation coefficient for equalization within the setting time.

* * * * *